US006401039B1

(12) United States Patent
Baron et al.

(10) Patent No.: US 6,401,039 B1
(45) Date of Patent: Jun. 4, 2002

(54) SYSTEM AND METHOD FOR PROJECTING STORMS USING NEXRAD ATTRIBUTES

(75) Inventors: Robert O. Baron, Huntsville; Tom S. Thompson, Athens; Tony L. Benson, Huntsville, all of AL (US)

(73) Assignee: Baron Services, Inc., Huntsville, AL (US)

( * ) Notice: Subject to any disclaimer, the term of this patent is extended or adjusted under 35 U.S.C. 154(b) by 27 days.

(21) Appl. No.: 09/933,563

(22) Filed: Aug. 20, 2001

Related U.S. Application Data (63) Continuation of application No. 09/669,498, filed on Sep. 25, 2000, now Pat. No. 6,278,947, which is a continuation of application No. 09/021,448, filed on Feb. 10, 1998, now Pat. No. 6,125,328.
(60) Provisional application No. 60/036,952, filed on Feb. 10, 1997.

(51) Int. Cl.[7] ............................................. G06F 169/00
(52) U.S. Cl. ......................................................... 702/3
(58) Field of Search ........................... 702/3, 4; 342/26; 706/931

(56) References Cited

U.S. PATENT DOCUMENTS

| | | |
|---|---|---|
| 4,277,845 A | 7/1981 | Smith et al. |
| 4,347,618 A | 8/1982 | Kavouras et al. |
| 4,402,672 A | 9/1983 | Lowe, Jr. |
| 4,422,037 A | 12/1983 | Coleman |
| 4,506,211 A | 3/1985 | Coleman |
| 4,521,857 A | 6/1985 | Reynolds, III |
| 4,649,388 A | 3/1987 | Atlas |
| 4,712,108 A | 12/1987 | Schwab |
| 5,111,400 A | 5/1992 | Yoder |
| 5,117,359 A | 5/1992 | Eccles |
| 5,121,430 A | 6/1992 | Ganzer et al. |
| 5,175,551 A | 12/1992 | Rubin |
| 5,208,587 A | 5/1993 | Cornman |
| 5,255,190 A | 10/1993 | Sznaider |
| 5,315,297 A | 5/1994 | Cornman |
| 5,351,045 A | 9/1994 | Cornman |
| 5,359,330 A | 10/1994 | Rubin et al. |
| 5,406,481 A | 4/1995 | Shinozawa et al. |
| 5,432,895 A | 7/1995 | Myers |
| 5,490,239 A | 2/1996 | Myers |
| 5,517,193 A | 5/1996 | Allison et al. |
| 5,583,972 A | 12/1996 | Miller |
| 5,596,332 A | 1/1997 | Coles et al. |
| 5,654,886 A | 8/1997 | Zereski, Jr. et al. |
| 5,717,589 A | 2/1998 | Thompson et al. |
| 5,839,089 A | 11/1998 | Yasuda et al. |
| 6,125,328 A | 9/2000 | Baron et al. |
| 6,278,947 B1 | 8/2001 | Baron et al. |

OTHER PUBLICATIONS

Forsyth, "Real–Time Forecasting of Echo–Centroid Motion, A Thesis Submitted to the Graduate Faculty, The University of Oklahoma Graduate College," (1979).

(List continued on next page.)

Primary Examiner—Donald E. McElheny, Jr.
(74) Attorney, Agent, or Firm—Lenier Ford Shaver & Payne; David L. Berdan (57) ABSTRACT

The subject invention provides an improved system and method for combining data obtained from the NEXRAD™ system of the National Weather Service ("NWS") with geographical and topological database information to achieve an improved and informative graphical storm-tracking display able to project the movement of a storm with a single user-operation. The method of projecting storm movement includes the following steps: collecting NEXRAD data attributes from a weather data source; calculating storm position using the collected NEXRAD attributes; calculating projected storm movement using the storm position and the collected NEXRAD attributes; displaying a graphic representation of the projected storm movement.

21 Claims, 5 Drawing Sheets

OTHER PUBLICATIONS

Klazura and Imy, "A Description of the Initial Set of Analysis Products Available from the NEXRAD WSR–88D System," Bulletin of the American Meteorological Society, American Meteorological Society (USA), vol. 74 (No. 7), pp. 1293–1311, (Jul., 1993).

Crum and Alberty, "The WSR–88D and the WSR–88D Operational Support Facility," Bulletin of the American Meteorological Society, American Meteorological Society (USA), vol. 74 (No. 9), pp. 1669–1687, (Sep., 1993).

Dixon and Wiener, "TITAN: Thunderstorm Identification, Tracking, Analysis and Nowcasting—A Radar–based Methodology," Journal of Atmospheric and Oceanic Technology, American Meteorological Society (USA), vol. 10 (No. 6), pp. 785–797, (Dec., 1993).

U.S. Department of Commerce, Office of the Federal Coordinator for Meteorological Services and Supporting Research, "Doppler Radar Meteorological Observations, Part A, System Concepts, Responsibilities, and Procedures," Federal Meteorological Handbook No. 11, (Jun., 1991).

Greene and Clark, "Vertically Integrated Liquid Water—A New Analysis Tool, " Monthly Weather Review, United States Department of Commerce (USA), vol. 100 (No. 7), pp. 548–552, (Jul., 1972).

Wilk and Gray, "Processing and Analysis Techniques Used With the NSSL Weather Radar System," 14th Radar Meteorology Conference, pp. 369–374, (Nov. 17, 1970).

Bjerkaas and Forsyth, "An Automated Real–Time Storm Analysis and Storm Tracking Program (WEATRK)," Air Force Systems Command, USAF (USA), pp. 1–115, (Oct. 1, 1980).

Johnson, MacKeen, Witt, Mitchell, Stumpf, Eilts, Thomas, "The Storm Cell Identification and Tracking Algorithm: An Enhanced WSR–88D Algorithm," Weather and Forecasting, American Meteorological Society (USA), vol. 13 (No. 2), (Dec. 9, 1997).

Rosenfeld, "Objective Method for Analysis and Tracking of Convective Cells as Seen by Radar," Journal of Atmospheric and Oceanic Technology, American Meteorological Society (USA), pp. 422–434, (Jan. 7, 1987).

Brown and Wood, "On the Interpretation of Single–Doppler Velocity Patterns Within Severe Thunderstorms," Weather and Forecasting, American Meteorological Society (USA), pp. 32–128, (Sep. 12, 1990).

Brady, Schroeder and Poellot, "Automatic Identification of Tracking of Radar Echoes in Hiplex," Department of Aviation, University of North Dakota (Grand Forks, ND), pp. 139–143.

Crane, "Automatic Cell Detection and Tracking," IEEE Transactions on Geoscience Electronics, Geoscience Electronics (USA), vol. 17 (No. 4), pp. 250–262, (Oct., 1979).

Davies and Johns, "Some Wind and Instability Parameters Associated with Strong and Violent Tornadoes 1. Wind Shear and Helicity," The Tornado: Its Structure, Dynamics, Prediction, and Hazards, American Geophysical Union (USA), pp. 573–582, (Sep., 1993).

Sappanos, "New WXAdvisor has Arrived for Triton I7 Triton I7 Release 3.0 Automates Weather Room," On the Front, Kavouras, Inc. (USA), vol. 4 (No. 12), p. 13, (Nov., 1993).

Kavouras, Inc., "It's Breakthrough Time!," NAB Brochure, Kavouras, Inc. (USA), p. 1, (Sep., 1993).

Baron Services, Inc., "OmniWxSystems," OmniWxSystems sales brochure, Baron Services, Inc. (USA), (Feb. 1, 1994).

Kavouras, Inc., "Storm Tracker Demonstration Program," Kavouras, Inc. (USA), pp. 1–3, (May 11, 1992).

Kavouras, Inc., "NEXRAD AutoTrack Overview," Kavouras, Inc. (USA), (Dec. 20, 1995).

Baron Services, Inc., "Collins Radar, Dramatic New Upgrades," Baron Services, Inc. (USA), (Jul. 19, 1995).

Ciardi and Botner, "Beta Test Plan for Build 9.0," WSR–88D Operational Support Facility, (Jul. 13, 1996).

Operations Training Branch, "Build 9.0 Precursor Training," Operations Training Branch (USA), (Jul. 15, 1996).

Kavouras, Inc., "AutoTrak," Kavouras, Inc. (USA), (Sep., 1997).

Phillips, "Time Is On Your Side With NEXRAD Autotrak," On the Front, Kavouras, Inc. (USA), vol. 6 (No. 4), p. 6, (Jul. 19, 1996).

Chenevert, "The WSR–88D Storm Identification and Tracking Algorithms," On The Front, Kavouras, Inc. (USA), vol. 6 (No. 4), p. 5, (Jul., 1996).

SYSTEM AND METHOD FOR PROJECTING STORMS USING NEXRAD ATTRIBUTES

CROSS REFERENCE TO RELATED APPLICATION

This application is a continuation of U.S. application Ser. No. 09/669,498, filed Sep. 25, 2000, now U.S. Pat. No. 6,278,947, which is a continuation of U.S. application Ser. No. 09/021,448, filed Feb. 10, 1998, now U.S. Pat. No. 6,125,328, which claims the benefit of Provisional Application No. 60/036,952, filed Feb. 10, 1997, all of which are incorporated herein by reference.

BACKGROUND OF THE INVENTION

1. Field of the Invention

The present invention relates to an improved system and method for combining data obtained from the NEXRAD™ system of the National Weather Service ("NWS") with geographical and topological data base information to achieve an improved and informative graphical storm-tracking display able to predict and project the direction of a storm with a single user-operation.

2. Technical Background

NEXRAD is a system of weather services provided by the NWS. NEXRAD employs a system of radars scattered throughout the country which provides weather data to subscribers. Subscribers, such as television stations desiring to transmit weather broadcasts, use data from the NEXRAD system in its basic form. Current systems of subscribers typically extract simple storm information from the NEXRAD data to provide viewers with basic storm location information.

One NEXRAD service is the "NEXRAD Attributes." This service provides the subscribers with detailed information concerning storms detected at each NEXRAD radar site. The NEXRAD Attributes data includes the following information for each storm:

| | |
|---|---|
| ID | a unique 3-digit identifier |
| AZ | the direction of the storm in degrees from the radar source |
| RANGE | the distance of the storm in nautical miles from the radar source |
| TVS | the likelihood of a tornado vortex signature (Yes or No) |
| MESO | the likelihood of mesocyclonic activity (Yes or No) |
| HAIL | the likelihood of hail (% change of hail, % chance of severe hail, approximate hail size in inches) |
| DBZM | the maximum DBZ level (a measurement of precipitation intensity) |
| FCST_ANGLE | forecasted movement angle (storm path) in degrees |
| FCST_MVMT | forecasted movement speed in nautical miles per hour |

Figure 1:
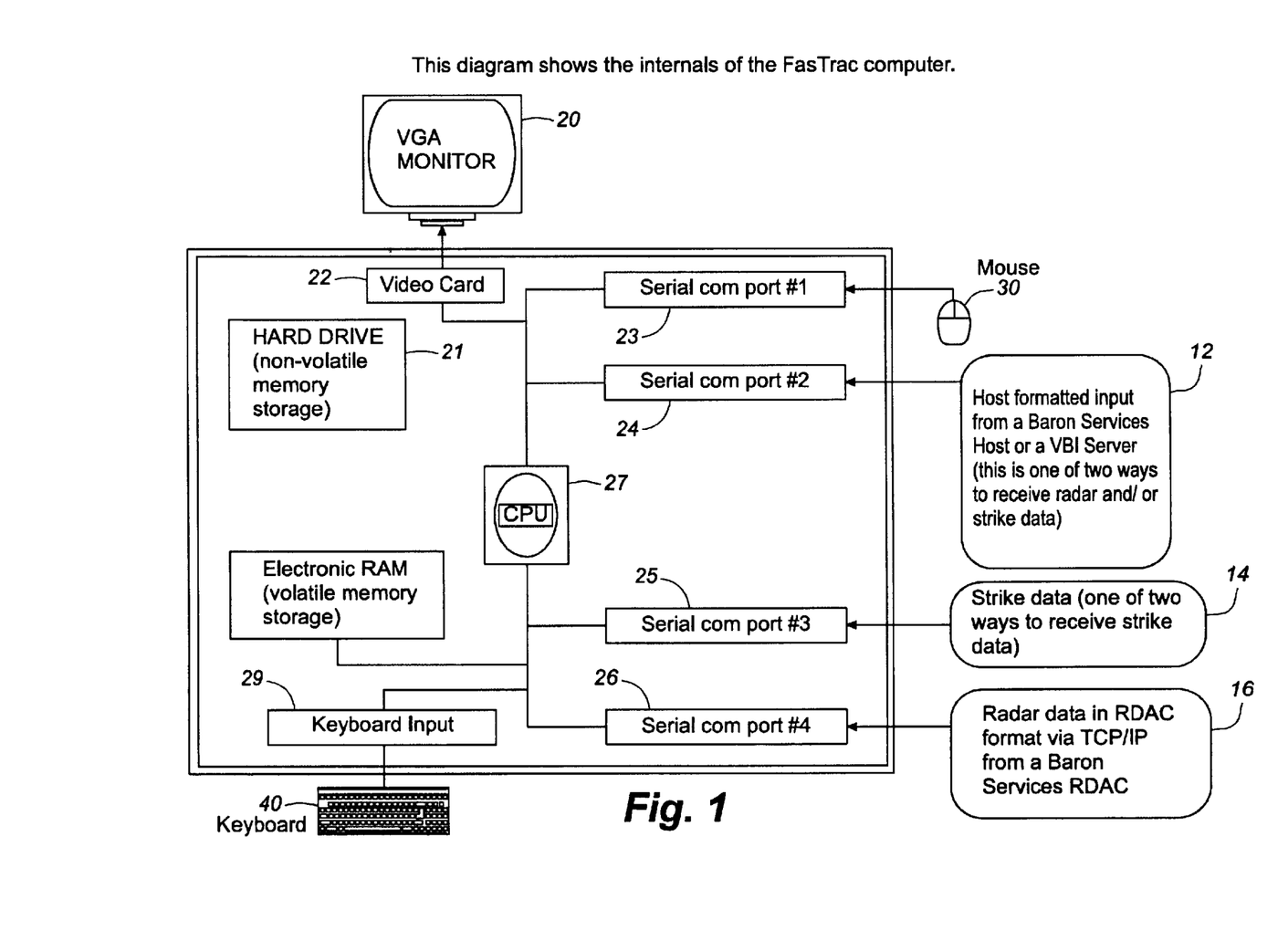
FIG. 1 is a diagram of the preferred embodiment of the internal devices of a computer for use in the present invention.

The typical current NEXRAD system used by a NEXRAD subscriber receives NEXRAD data via a satellite downlink or over a wired network connection into a computer, such as the computer illustrated in the attached FIG. 1. Then, the current subscriber's system extracts the azimuth and range information of the subject storm. From this information, the current systems can plot a two dimensional representation of the storm. Most of the other information in the NEXRAD Attributes goes unused by current systems, although the user, typically a meteorologist, can review this data manually.

One problem with a subscriber's current system is that in order to predict the movement of a storm, the user must manually create projections from the NEXRAD Attributes data. Current systems do not have the capability to create a graphical representation of the storm movement from the NEXRAD Attributes data without substantial human involvement.

Moreover, the current graphical storm display is typically limited to simple two dimensional representations of the storm's location and little else. Typically the viewers of weather displays based on the current systems have only a vague concept of the proximity of the storm to their location. Current systems are incapable of displaying NEXRAD projection information concerning those storms in any appreciable graphical way.

SUMMARY OF THE INVENTION

A method for projecting storms using NEXRAD attributes comprising the steps of:

(a) collecting NEXRAD data attributes from a weather data source;

(b) calculating storm position using the collected NEXRAD attributes;

(c) calculating projected storm movement using the storm position and the collected NEXRAD data attributes;

(d) displaying a graphic representation of the projected storm movement;

(e) determining the communities in the path of the projected storm movement.

In addition, the present invention, in a preferred embodiment further comprises the following steps:

(f) displaying the communities indicating the estimated time of arrival for the projected storm;

(g) sorting multiple storms;

(h) displaying the sorted storms in order of priority; and (i) displaying single storm details.

DETAILED DESCRIPTION OF THE INVENTION

Figure 3:
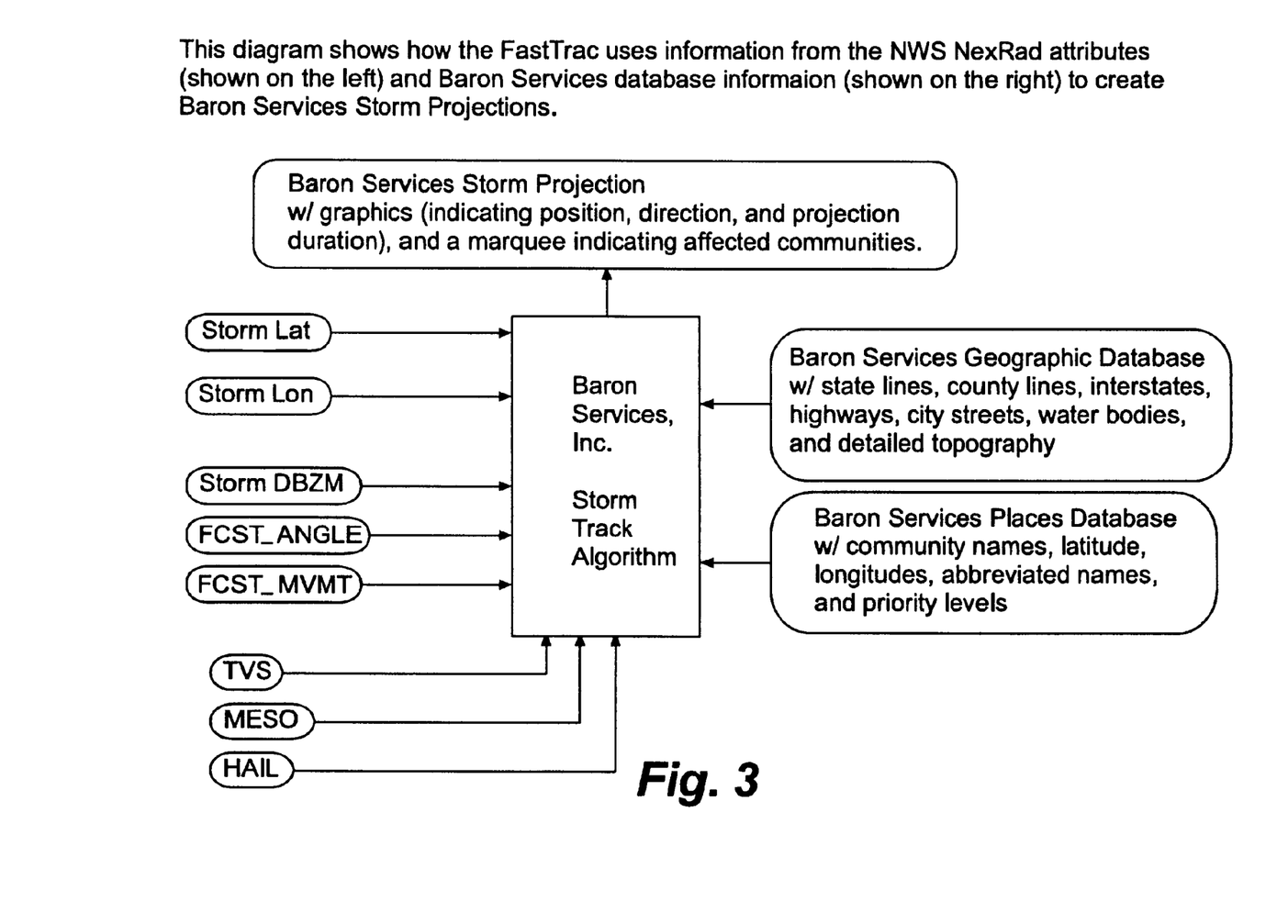
FIG. 3 is a diagram of the computer of FIG. 1 and its use of the information from the NEXRAD attributes and database information to create storm projections of the present invention.

The present invention improves over the prior art by utilizing the NEXRAD Attributes storm projection information, represented by the variables FCST_ANGLE and FCST_MVMT above and shown in FIG. 3, to provide the users of the present invention the ability to graphically display storm projection information with a single operation. The present invention extracts the NEXRAD Attributes storm projection information and adapts that information for graphical display. The use of the projection data in the present invention allows the user to have the storm location information graphically displayed, such as on a computer monitor screen or television set, overlaid with a graphical representation of the projected movement of the storm.

The steps which the present invention utilizes to achieve a storm projection system that will provide the user with storm prediction information in one operation can be briefly summarized as follows:

The first step is collecting NEXRAD Attributes for use by the storm projection system by receiving NEXRAD Attributes information via a satellite downlink, wired network, or other information transfer medium, and storing this information in a database.

In a preferred embodiment, the database contains the following attributes for each storm:

| Attribute | Range of Values |
| --- | --- |
| The presence of a Tornadic Vortex Signature (TVS) | YES or NO |
| The presence of Mesocyclonic activity (MESO) | YES or NO |
| Chance of Hail | 0% to 100% |
| Chance of Severe Hail | 0% to 100% |
| Hail Size in inches | 0.00" to 4.00+" |
| Maximum Storm DBZ (measurement of rainfall intensity) | 30 to 75+ DBZ |
| Height of max DBZ reading in the Storm | 1-75 thousand of feet |
| Storm Height | 1-75 thousand of feet |
| Storm position (latitude and longitude) | N/A |
| Storm forecasted angle | 0 to 359 degrees |
| Storm forecasted movement | 0 to 60+ mph |
| Storm Vertically Integrated Liquid (VIL) | 0 to 75+ kg/m |
| Range in nautical miles from radar | |
| Azimuth (direction) in degrees from radar | |

The database information is accessed to report the contents and characteristics of storms and to track the storms in near real-time.

Second, in response to a user request for a projection of a storm's movement, the system retrieves the NEXRAD Attributes information for a subject storm stored in the first step above. The user request may be made using a manual input device such as a mouse or keyboard as shown in FIG. 1.

Figure 2:
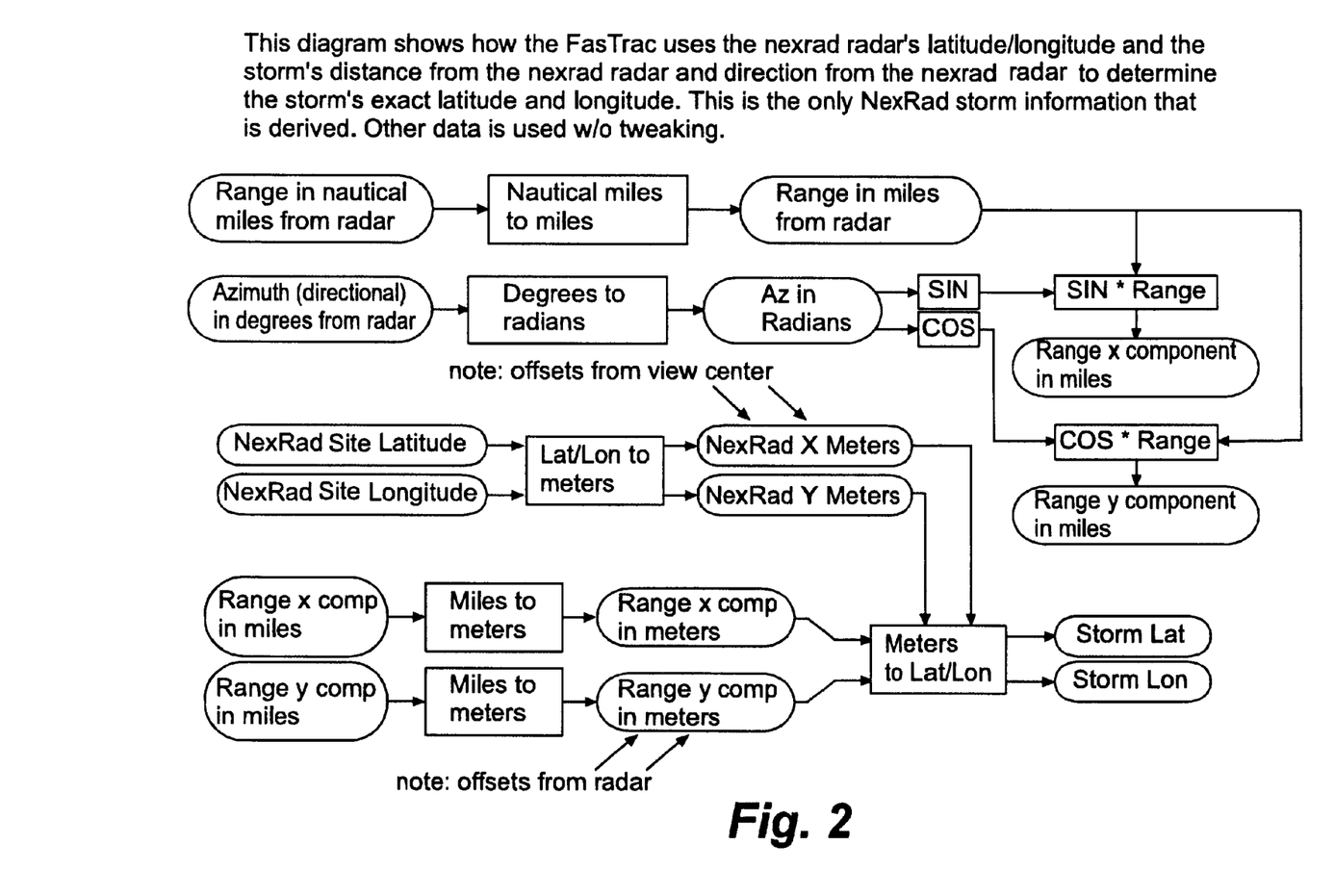
FIG. 2 is a diagram of the computer of FIG. 1 and its use of the NEXRAD radar's latitude/longitude and the storm's distance and direction from the NEXRAD radar to determine the storm's exact latitude and longitude.

Third, the system calculates a storm projection arc to create a graphical representation of the storm for display, said calculation comprising the steps of:

(a) Using the storm's offset in meters from the view center of the graphical display (FIG. 2) to find the storm's position in latitude/longitude;

(b) Using the storm information (including fanout in degrees, direction in degrees, projection length in meters, and position as an offset in meters) to find the four corners of an arc describing the storm's projected path (the "storm projection arc");

(c) Using the storm information (including fanout in degrees, direction in degrees, projection length in meters, and position as an offset in meters) to find the storm's projected position after moving "length" meters;

(d) Using the storm information (including fanout in degrees, direction in degrees, projection length in meters, and position as an offset in meters) to find the center of a bounding circle that helps define the limits of the projection;

(e) Using the four corners of the storm projection arc to define the maximum latitude, maximum longitude, minimum latitude, and minimum longitude at which a place in this track may be positioned;

(f) Using the four corners of the storm projection arc (see (b) above) to define the bounding lines of the arc that will define the storm projection;

Fourth, a general database of geographical information (FIG. 3) is stored on the computer in the form of a database containing latitude and longitude information, as well as other identifying and prioritizing information for all known cities and communities, hereinafter "places", in the area of interest for a user of the present invention.

In a preferred embodiment, the places may be further grouped and related based upon their geographic proximity to each other such as being members of the same county, same state, same region, etc. The selected groups may be identified by minimum and maximum longitude and minimum and maximum latitude.

When determining which places are in the path of a storm, the following steps are performed:

1. If the places are grouped as described in the preferred embodiment, and the group's minimum latitude, minimum longitude, maximum latitude and maximum longitude indicate that one of the places in the group are within the arc of the storm projection, then skip that group of places;

2. Next, for each place not eliminated in step (1) above, do the following:

(a) If the place's latitude exceeds the minimum or maximum latitude requirements—skip it;

(b) If the place's longitude exceeds the minimum or maximum longitude requirements—skip it;

(c) If the place's priority level indicates that it should not appear at this track range (based on user-defined parameter for this particular track)—skip it; and (d) If the place's latitude/longitude is not within the bounding circle (see above)—skip it.

(The above elimination steps represent the preferred embodiment, but they may be performed in any order. In addition, the user may identify other bases for eliminating certain places from the eventual display.)

Fifth, if a particular place has not been eliminated, it is within the path of the storm.

Sixth, by linear extrapolation, the current time, the storm's position, the storm's speed/direction, and the position of this place are used to determine the storm's ETA for this lace.

Figure 4:
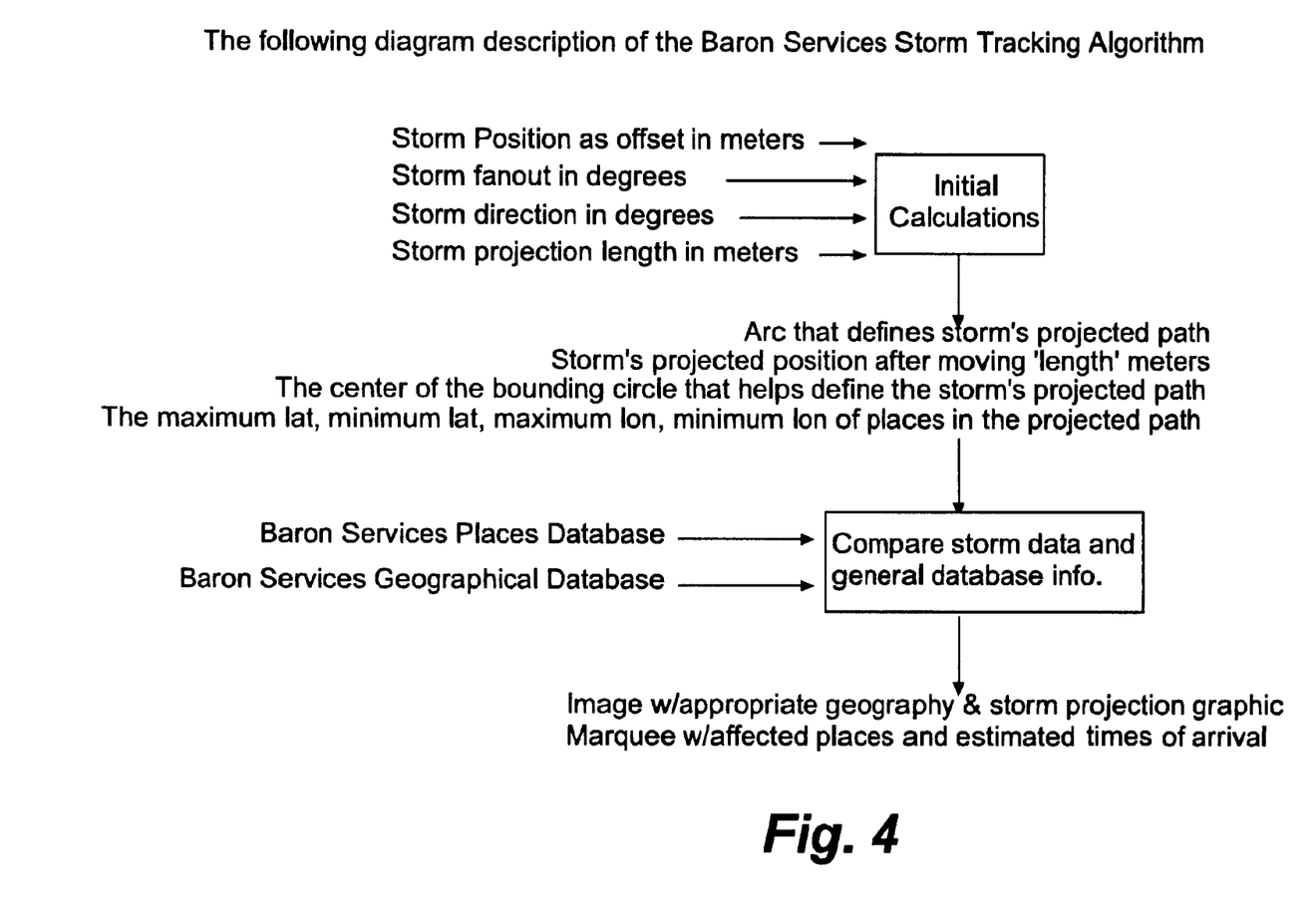
FIG. 4 is a diagram generally describing the storm tracking algorithm of the present invention.

Seventh, the system displays the storm projection arc, a topographical map of the affected area, and iconic representations of the places affected (refer to FIGS. 3 and 4 for general diagrams of this step) overlaid on top of a graphical representation of the storm.

Figure 5:
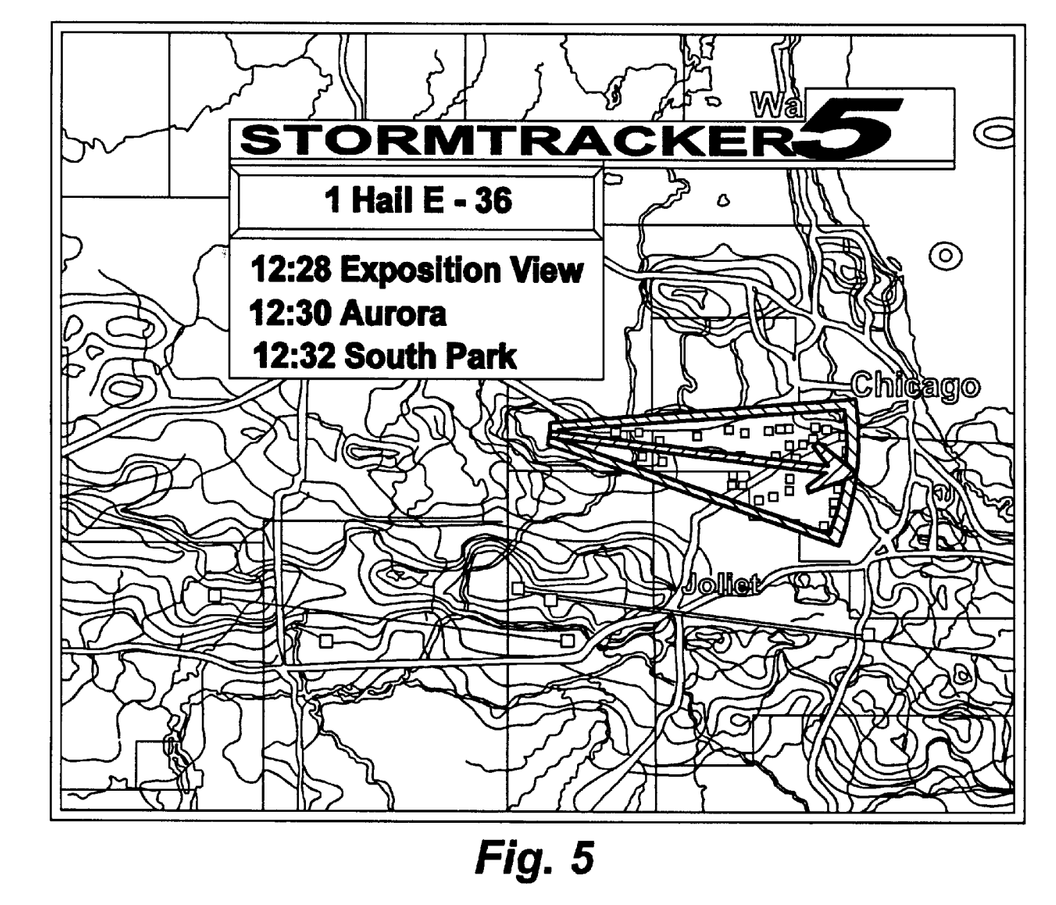
FIG. 5 is representative of a graphical output of the invention.

FIG. 5 illustrates a preferred embodiment of a display of projected storm movements, the communities within the path of a storm, and the ETA for each community.

Finally, in the case of multiple storms, a sorting technique is used to prioritize storms. The priorities for sorting are based upon the following criteria:

1. The presence of a Tornadic Vortex Signature (a.k.a. TVS). This is either YES or NO.

2. The presence of mesocyclonic activity (a.k.a. MESO). This is either YES or NO.

3. The presence and estimated size of hail (size is measured in inches and is accurate to ¼ of an inch).

4. The highest recorded DBZ (a measurement of the intensity of the rainfall).

5. The estimated storm speed in mph.

These sorting criteria are in order of importance. The criteria are plugged into the following formula to determine the "weight" of the storm. The storm with the greatest weight has the highest priority.

weight=0;

if TVS presence weight=weight+1,000,000,000 if MESO presence weight=weight+100,000,000 if hail size>0.00 weight=weight+hail size*10,000,000.0 weight=weight+DBZ*100 weight=weight+speed (in mph)

This formula tracks and assures that each criteria has a larger weight factor than its successor.

It should be noted that, in addition to the storm prediction achieved through the novel and non-obvious use of the NEXRAD Attributes, the present invention improves over the prior art by merging the weather, storm, and prediction information described above with geographic and topological information to achieve an enhanced and visually-appealing display. This application allows the user to provide a graphical weather display which overlays storm information on top of actual geographical information. Combining these two forms of information allows the user of the present invention to provide to its viewers or consumers weather forecasting at its most advanced level.

The ease with which the user can use the present system to obtain a storm tracking prediction, is evidenced by the fact that the user need only select the storm cell of interest, and the storm position is displayed automatically. Therefore, viewers of weather forecasting displayed through the use of the present invention will have available prediction information specifically tailored to the viewers' own viewing area. For instance, viewers in small towns that previously could only guess at what time a storm would arrive at their location may now be given that information in a highly accurate and graphically appealing way. This improvement will detail exact and highly precise times at which storms or other weather phenomenon will arrive at any of several towns or cities in a geographical database provided with the present invention.

It should be understood to those skilled in the art that other modifications and changes can be made without departing from the spirit and scope of the invention and without diminishing its attendant advantages. It is therefore intended that such changes and modifications be covered by the following claims.

What is claimed is:

1. The method of processing meteorological data, said method comprising the steps of:
   receiving NEXRAD attribute data corresponding to a storm position relative to a radar site;
   deriving from said NEXRAD attribute data a storm location relative to a viewing area the center of which is remote from the radar site; and
   calculating a projected storm path using said derived storm location and said NEXRAD attribute data.

2. The method of claim 1 further comprising the steps of:
   retrieving geographical data corresponding to said projected storm path, said geographical data comprising at least one area of interest including a plurality of populated areas; and
   comparing the plurality of populated areas to said projected storm path to determine which of the plurality of populated areas fall within said projected storm path.

3. The method of claim 2 further comprising the step of displaying a graphical representation of said projected storm path.

4. The method of claim 3 further comprising the step of displaying the plurality of populated areas falling within said projected storm path.

5. The method of claim 1 wherein said deriving step comprises the step of determining the latitude and longitude of the storm location from a storm range and azimuth relative to the radar site.

6. A method of processing meteorological data, said method comprising the steps of:
   receiving NEXRAD attribute data corresponding to a meteorological event;
   deriving a meteorological event position from said received NEXRAD attribute data; and
   calculating a projected meteorological event path from said derived meteorological event position and said received NEXRAD attribute data.

7. The method of claim 6 wherein said receiving step comprises the step of collecting NEXRAD attribute data corresponding to a storm position relative to a radar site.

8. The method of claim 7 wherein said deriving step comprises the step of determining a storm location relative to a viewing area, the center of which is remote from the radar site.

9. The method of claim 6 further comprising the step of retrieving geographical data including at least one area of interest having a plurality of populated areas therein.

10. The method of claim 9 further comprising the step of comparing the plurality of populated areas to said projected meteorological event path to determine which of the plurality of populated areas fall within the projected meteorological event path.

11. The method of claim 10 further comprising the step of displaying the plurality of populated areas falling within the projected meteorological event path.

12. A system for processing meteorological data, said system comprising:
   memory configured to receive NEXRAD attribute data corresponding to a storm position relative to a radar site; and
   a CPU communicating with said memory and instructed to derive from said received NEXRAD attribute data a storm location relative to a viewing area, the center of which is remote from the radar site, said CPU being programmed to calculate a projected storm path using said derived storm location and the received NEXRAD attributed data.

13. The system of claim 12 further comprising a database comprising stored geographical data, said geographical data including at least one area of interest defining a plurality of populated areas.

14. The system of claim 13 wherein said CPU is instructed to compare said projected storm path to the geographical data to determine which of said plurality of populated areas fall within said projected storm path.

15. The system of claim 14 further comprising a display device communicating with said CPU to graphically display the plurality of populated areas falling within said projected storm path.

16. A system for processing meteorological data, said system comprising:
   memory configured to receive NEXRAD attribute data corresponding to a meteorological event; and
   a CPU communicating with said memory and instructed to derive a meteorological event position from the NEXRAD attribute data, said CPU being programmed to calculate and project a meteorological event path from said derived meteorological event position and the received NEXRAD attribute data.

17. The system of claim 16 wherein the meteorological event comprises a storm position relative to a radar site.

18. The system of claim 17 wherein said CPU is instructed to calculate a storm location relative to a viewing area, the center of which is remote from the radar site.

19. The system of claim 16 further comprising a database comprising stored geographical data including at least one area of interest defining a plurality of populated areas.

20. The system of claim 19 wherein said CPU communicates with said database to compare the geographical data with said projected meteorological event path to determine which of said plurality of populated areas fall within said projected meteorological event path.

21. The system of claim 20 further comprising a display device communicating with said CPU to graphically display the plurality of populated areas falling within said projected meteorological event path.

\* \* \* \* \*